United States Patent [19]

Gargos

[11] Patent Number: 4,684,815
[45] Date of Patent: Aug. 4, 1987

[54] POWER PLANT DRIVEN BY WAVES

[76] Inventor: Gary Gargos, 355 W. Windsor Rd., Glendale, Calif. 91204

[21] Appl. No.: 818,091

[22] Filed: Jan. 10, 1986

[51] Int. Cl.⁴ ............................................. F03B 13/12
[52] U.S. Cl. ...................................... 290/53; 290/42; 60/501
[58] Field of Search ...................... 290/42, 53; 60/500, 60/501; 417/330, 331, 332

[56] References Cited

U.S. PATENT DOCUMENTS

| | | | |
|---|---|---|---|
| 1,018,678 | 2/1912 | Nelson | 60/501 X |
| 3,961,863 | 6/1976 | Hooper, III | 290/53 X |
| 4,077,213 | 3/1978 | Hagen | 60/501 X |
| 4,210,821 | 7/1980 | Cockerell | 290/53 |
| 4,392,349 | 7/1983 | Hagen | 60/500 |

Primary Examiner—William M. Shoop, Jr.
Assistant Examiner—W. E. Duncanson, Jr.
Attorney, Agent, or Firm—Lyon & Lyon

[57] ABSTRACT

A float mechanism for generating energy from waves. Floats are coupled together such that they can pivot about a horizontal axis relative to one another. Hydraulic cylinders on either side of the attachment points compress and extend with the wave motion. Check valves control flow to and from the cylinders. The floats are pivotally tied to a floating structure such that they can pivot about the structure on the surface of the water as may be required for maximum efficiency. Water compressed from the cylinders feeds a turbine which in turn feeds a generator for the generation of electrical power.

4 Claims, 3 Drawing Figures

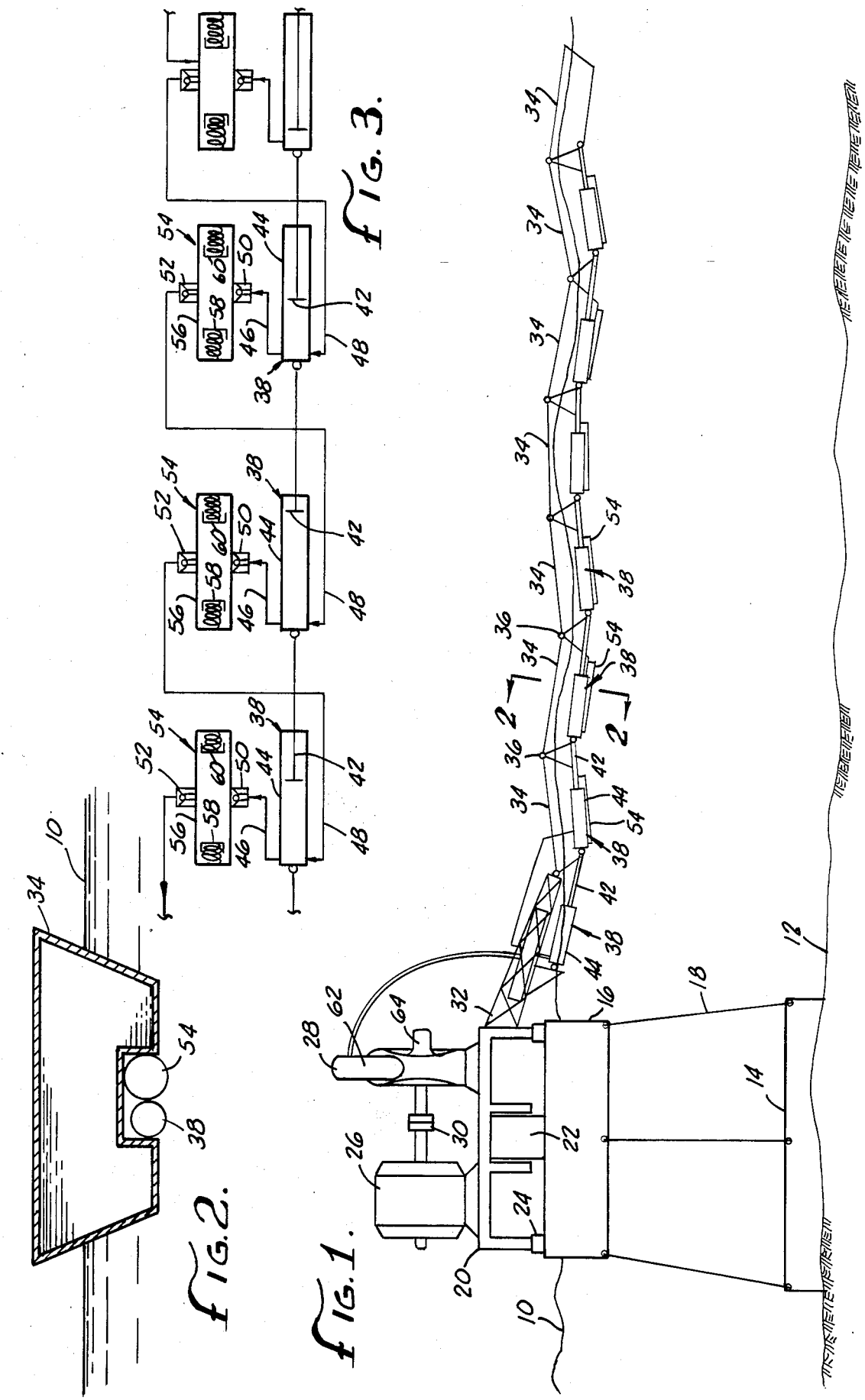

POWER PLANT DRIVEN BY WAVES

BACKGROUND OF THE INVENTION

The field of the present invention is power plants for generating electrical energy from waves.

Increasingly, energy in various forms is being employed as potential sources for the generation of useful power. Among these sources is wave energy on large bodies of water. An unlimited supply of energy is available from this source if it can be economically harnessed. One such mechanism useful for boat propulsion employing the energy in waves is illustrated in my U.S. Pat. No. 4,481,002, BOAT POWERED BY SEA WAVES, the disclosure of which is incorporated herein by reference.

SUMMARY OF THE INVENTION

The present invention is directed to a power generation system using waves on a body of water. A series of floats are coupled together with hydraulic cylinders coupled between adjacent floats. The floats experience relative motion due to wave action and the hydraulic cylinders are expanded and contracted thereby. The cylinder actuation then drives a turbine which in turn powers a generator.

In further aspects of the invention, the floats may pivot about a vertical axis on a floating structure to best align the floats for maximizing power generation.

Accordingly, it is an object of the present invention to provide an improved power generation system using waves. Other and further objects and advantages will appear hereinafter.

BRIEF DESCRIPTION OF THE DRAWINGS

FIG. 1 is a schematic illustration of the power generation system of the present invention.

FIG. 2 is a cross-sectional view taken along line 2—2 of FIG. 1.

FIG. 3 is a schematic illustration of the hydraulic system of the present invention.

DETAILED DESCRIPTION OF THE PREFERRED EMBODIMENT

Turning in detail to the drawings, a power generation system is illustrated associated with a body of water. The body of water 10 having a bottom 12 supports an anchoring structure 14. The anchoring structure 14 may take any convenient form capable of holding the mechanism in place. A floating structure 16 is maintained in a slightly submerged state with anchoring chains 18 extending from the anchor structure 14 under tension. Thus, a stable structure is established which does not significantly move in the wave action of the body of water.

Positioned atop the floating structure 16 is a platform 20. The floating structure 16 includes a pivot member 22 about which the platform 20 is pivotally supported. Rollers 24 or other low friction members may be employed to facilitate pivotal motion of the platform 20 relative to the floating structure 16. Supported atop the platform 20 are a generator 26 and a turbine 28. The generator 26 and turbine 28 are coupled together such that the turbine 28 is capable of driving the generator 26 through a coupling mechanism 30. Suitable weather protection may be afforded by covering the generator 26 and turbine 28 on the platform 20 where desired.

Coupled to the platform 20 is a mouring structure 32. The mouring structure 32 extends downwardly to near the water line where it couples with a plurality of floats 34. Any practical number of floats 34 may be employed arranged in seriatim and coupled by means of hinges 36 to one another, end to end. The floats are to remain bouyant such that they ride on the water. Their longitudinal dimension must be such that they will preferably pitch relative to one another in the waves. The hinges 36 may be of conventional design designed for sufficient strength to maintain the floats together even in rough seas. The leading and trailing sides of the floats 34 are beveled such that they can accommodate substantial pivotal movement of one float relative to the adjacent float.

Coupled between adjacent floats 34 are hydraulic cylinders 38. It is possible to mount a plurality of such hydraulic cylinders between adjacent floats, two on each side of a pair of floats, or two cylinders capable of accommodating twice the load may be employed. In this embodiment, one cylinder is employed. The hydraulic cylinders 38 are pinned at each end to adjacent floats 34 to accommodate the relative pivotal motion between floats 34 and to shorten and lengthen as the floats are influenced by the passing waves.

The hydraulic cylinders 38 each include a piston 42 and cylinder 44. An outlet 46 receives fluid pressure from the compressing hydraulic cylinder while an intake 48 receives additional charge during expansion of the hydraulic cylinder 38. A check valve 50 is interposed in the outlet 46 to allow one way flow away from the cylinder. A check valve 52 is also employed with the intake 48 to allow one way flow to the hydraulic cylinder during charging. The intake to the outermost hydraulic cylinder may be from the body of water. This intake opening is preferably well below the water line to insure that air is not sucked up into the cylinder during operation. A variable volume closed reservoir 54 is associated with each outlet 46. Each reservoir generally includes a cylinder 56 having spring loaded pistons 58 and 60. The reservoirs 54 receive water from the preceeding outlet 46 through the check valve 50. Pressurized water is supply water to the adjacent intake 48 through the check valve 52. In effect, the hydraulic cylinders 38 and variable volume reservoirs 54 are arranged in series alternating between the two devices to the turbine 28 at an intake 62. Once the pressure flow is employed by the turbine, the water is exhausted through the outlet 64 to return to the body of water.

To provide additional input, a last cylinder 38 may be coupled to the first float 34 and to the adjacent platform 20 at the mouring structure 32. This arrangement is best illustrated in FIG. 1.

Thus, a power generation system using the energy in waves within a body of water is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A power plant driven by waves, comprising
   a platform;
   a floating structure defining a vertical axis, said platform being supported on said floating structure and being pivotally mounted about said vertical axis on said floating structure;

an electrical generator on said platform;
a turbine on said platform coupled with said electrical generator to drive said electrical generator;
a plurality of floats arranged seriatim with a first said float coupled to said platform;
a plurality hinges fixed to said floats pivotally mounting adjacent said floats together about horizontal axes; and
hydraulic cylinders extending between adjacent said floats and laterally spaced from said hinge axes, each said hydraulic cylinder having a piston pinned to a said float and a cylinder pinned to an adjacent said float, said hydraulic cylinders being hydraulically coupled with said turbine.

2. The power plant of claim 1 wherein said cylinders each have an outlet hydraulically coupled with said turbine with a check valve to permit one-way flow toward said turbine and an inlet with a check valve to permit one-way flow toward said cylinders.

3. A power plant driven by waves, comprising
a platform;
an electrical generator on said platform;
a turbine on said platform coupled with said electrical generator to drive said electrical generator;
a plurality of floats arranged seriatim with a first said float coupled to said platform;
a plurality of hinges fixed to said floats pivotally mounted adjacent said floats together about horizontal axes; and
hydraulic cylinders extending between adjacent said floats and laterally spaced from said hinges axes, each said hydraulic cylinder having a piston pinned to a said float and a cylinder pinned to an adjacent said float, said hydraulic cylinders being hydraulically coupled with said turbine; and
variable volume closed reservoirs each hydraulically coupled with a said hydraulic cylinder, said hydraulic cylinders being hydraulically coupled with said turbine through said reservoirs.

4. The power plant of claim 3 wherein said hydraulic cylinders and reservoirs are in alternating hydraulic series.

* * * * *